United States Patent [19]

Mirtain

[11] 3,881,492

[45] May 6, 1975

[54] PNEUMATIC TIRE BREAKER ASSEMBLY

[75] Inventor: Henri J. Mirtain, Compiegne, France

[73] Assignee: Uniroyal, a Societe Anonyme, Clairoix, France

[22] Filed: Apr. 19, 1974

[21] Appl. No.: 462,262

[30] Foreign Application Priority Data
July 3, 1973  France .............................. 73.24443

[52] U.S. Cl. ..................... 152/361 R; 152/361 DM
[51] Int. Cl. .............................................. B60c 9/18
[58] Field of Search.... 152/361 R, 361 FP, 361 DM

[56] References Cited
UNITED STATES PATENTS

| | | | |
|---|---|---|---|
| 3,195,604 | 7/1965 | Boussu et al. | 152/361 R |
| 3,386,487 | 6/1968 | Massoubre | 152/361 DM |
| 3,515,197 | 6/1970 | Boileau | 152/361 FP |
| 3,559,714 | 7/1968 | Verdier | 152/361 DM |
| 3,830,276 | 8/1974 | Smithkey, Jr. | 152/361 FP |
| 3,834,439 | 9/1974 | Mirtain | 152/361 FP |

*Primary Examiner*—Drayton E. Hoffman
*Attorney, Agent, or Firm*—Philip Sands

[57] ABSTRACT

A pneumatic tire, comprising a carcass having a crown region, a tread overlying the crown region, and a reinforcing breaker assembly interposed between the tread and carcass, is disclosed. The breaker assembly includes a first pair supporting lying substantially in a common circumferential plane, the plies having respective marginal edge portions one of which overlaps the other and defines a second circumferential plane surrounding the first said circumferential plane. A second pair of plies overlie the first pair of plies, extend in the second said circumferential plane and are axially spaced from one another by the overlapping marginal edge portions of the first pair of plies.

17 Claims, 18 Drawing Figures

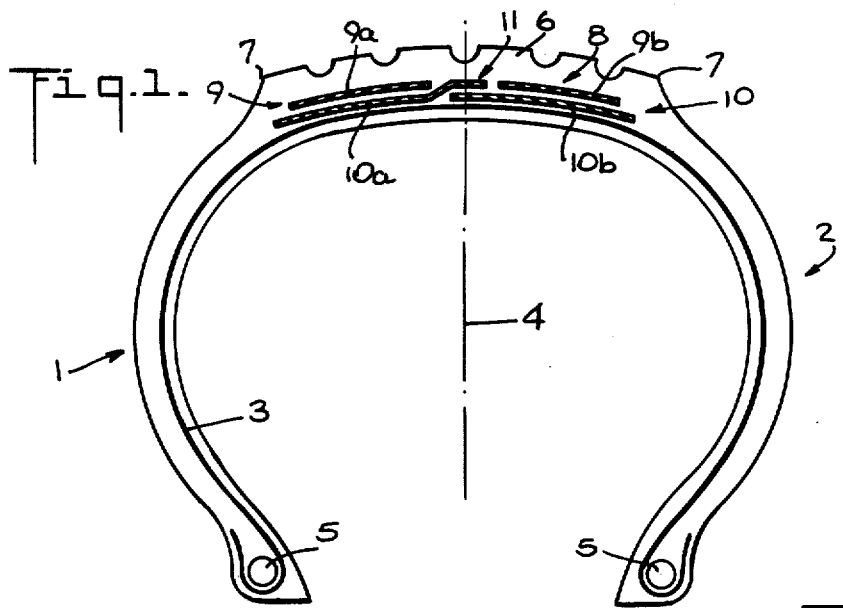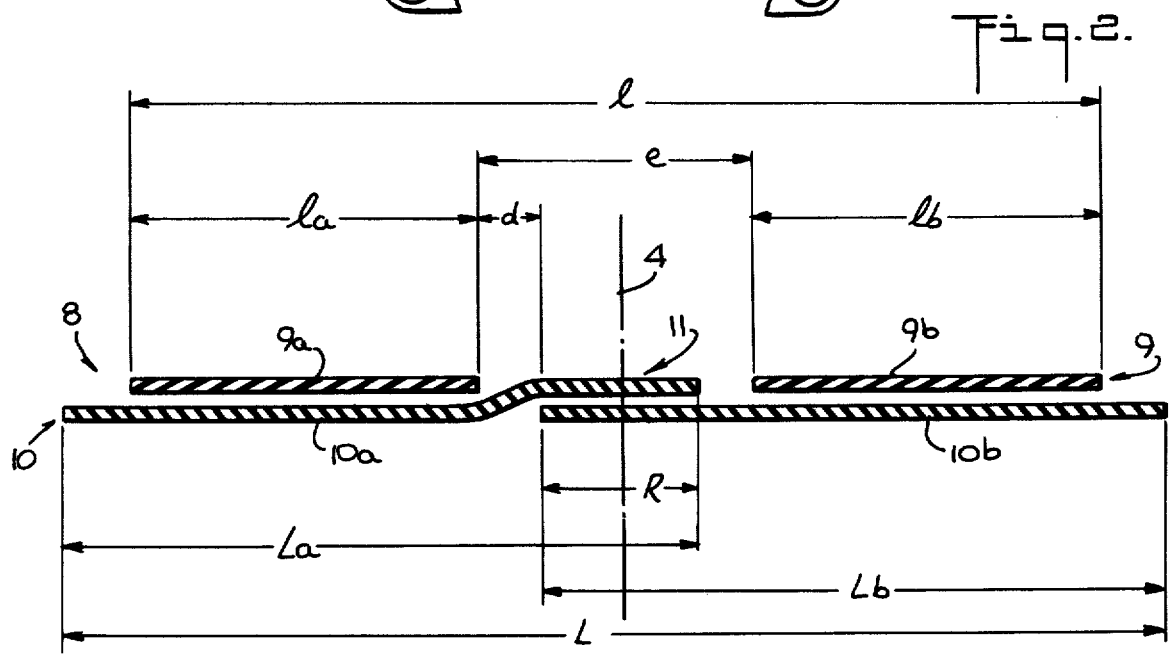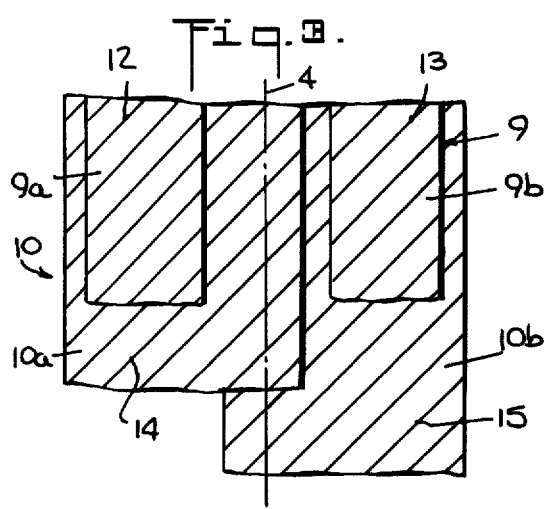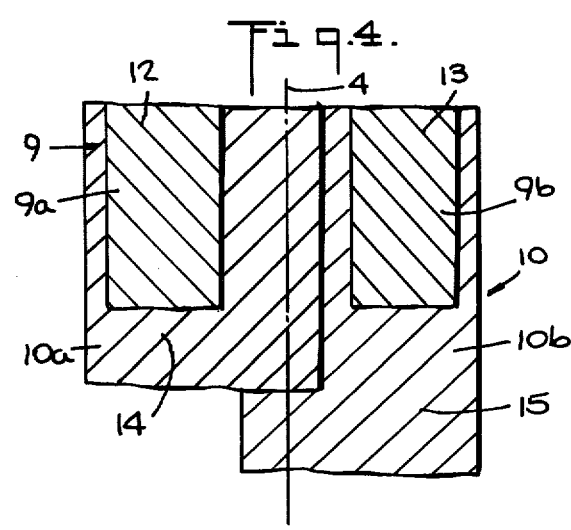

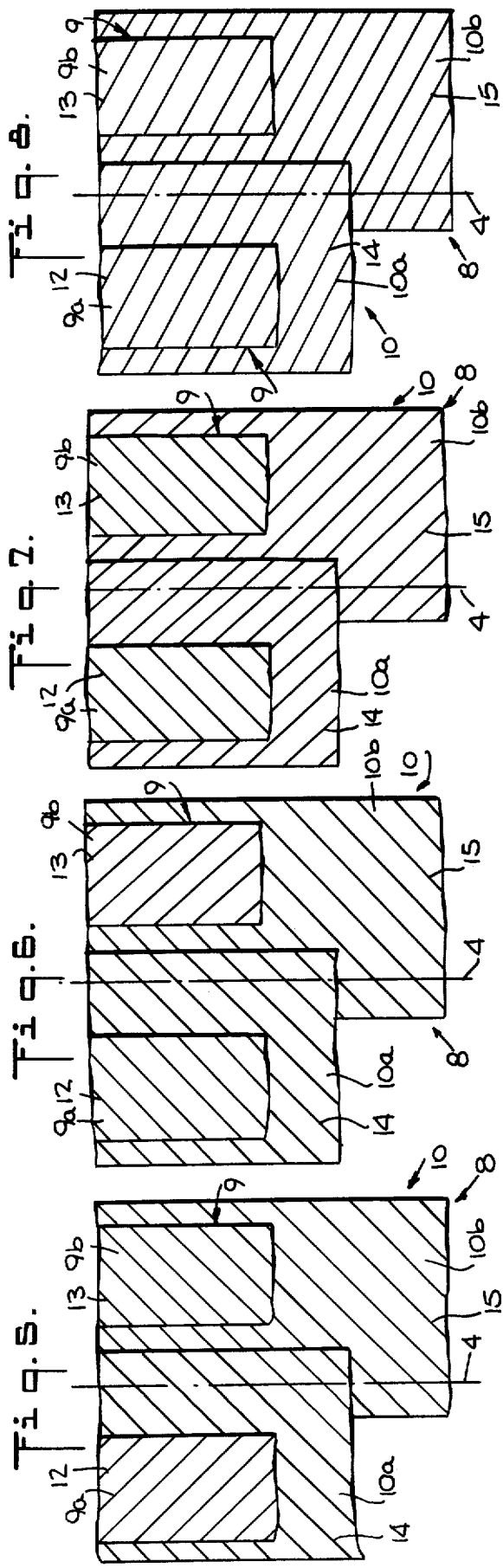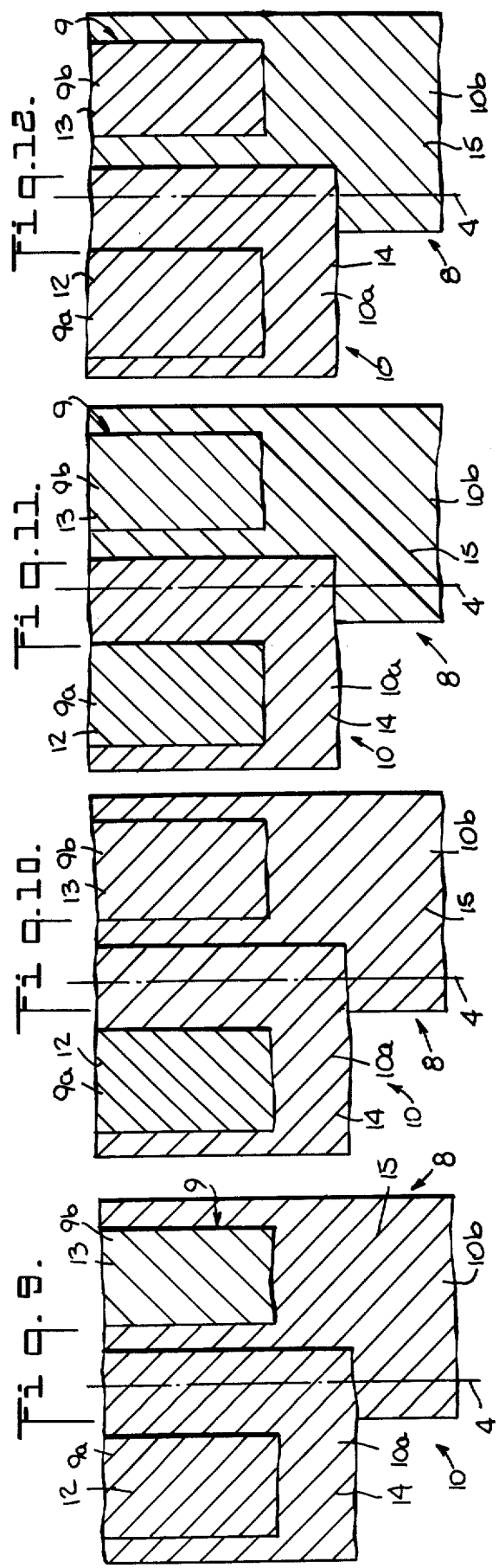

PNEUMATIC TIRE BREAKER ASSEMBLY

BACKGROUND OF THE INVENTION

The present invention relates generally to pneumatic tires, and more particularly to a reinforcing breaker assembly for such tires, the breaker assembly interpositioned between the tire carcass and tread.

Conventional breaker assemblies or breakers are generally comprised of a plurality of superposed plies, each ply being reinforced by spaced parallel cords which are embedded therein. The cords may be metallic such as steel or, alternatively, the cords may be constituted of natural or synthetic textiles. The plies themselves may be either symmetrically or asymmetrically disposed relative to one another, and either flat or folded.

Breakers are generally designed to accommodate numerous road conditions which affect tire behavior, control and stability at various speeds, as well as tire riding comfort. In order to accommodate as many of the road conditions which affect tires as possible, tire designers have increasingly designed each breaker assembly such that it is asymmetrical with respect to its cross-sectional configuration, ply and cord material content, and its relationship with the carcass and tread of the tire.

Tire designers are aware that even very small changes in breaker asymmetry can affect tire behavior, control and stability at different speeds, as well as tire riding comfort. Tire designers, thus, recognize that the very basic nature of the breaker construction (the number of plies and their superposed relationship with one another) should optimize the number of ways, or "degrees of freedom," by which the breaker assembly can be slightly asymmetrically varied or modified (without altering the basic nature of the breaker construction) to permit the finished breaker (with a minimum number of superposed plies and uniform thickness for economy) to most safely and comfortably control vehicular travel. Thus, it is the basic breaker construction which itself must provide for a safe and comfortable tire ride, and which should optimize the number of ways by which it can be slightly asymmetrically altered to accommodate all or substantially all road conditions. Breaker designs have not heretofore been so successful.

SUMMARY OF THE INVENTION

Accordingly, it is an object of the present invention to provide a new and effective pneumatic tire breaker assembly.

It is another object of the present invention to provide a breaker assembly for pneumatic tires which is so constructed that it presents, with a substantially uniform thickness, an optimum number of ways by which it can be slightly asymmetrically altered, during fabrication thereof, to most effectively accommodate most road conditions, at various speeds, with maximum tire control, stability and riding comfort.

With the above and additional objects in view, the present invention relates to a pneumatic tire having preferably, although not necessarily, a radial ply carcass, a tread overlying the crown region of the carcass, and an asymmetrical reinforcing breaker interposed between the tread and carcass. The breaker comprises a first pair of plies having respective marginal edge portions one of which overlaps the other, and a second pair of plies overlying the first pair of plies and axially spaced from one another by the overlapping marginal edge portions of the first pair of plies.

The provision of the two pairs of plies, one pair of plies overlapping each other, the other pair of plies being axially spaced from one another and overlying the first pair of plies, presents a construction which optimizes the number of ways that the breaker construction can be slightly asymmetrically varied to accommodate most road conditions in a controlled and stable manner.

DETAILED DESCRIPTION OF THE DRAWINGS

The present invention will be more clearly understood from the following detailed description thereof when read in conjunction with the accompanying drawings, wherein:

FIG. 1 is a cross-sectional view of a pneumatic tire incorporating the breaker assembly pursuant to the present invention;

FIG. 2 is a slightly exploded, schematic, sectional view of the breaker assembly pursuant to the present invention; and FIGS. 3 through 18 are respective fragmentary plan views of various embodiments of the breaker assembly pursuant to the present invention.

DETAILED DESCRIPTION OF THE INVENTION

Figure 13:
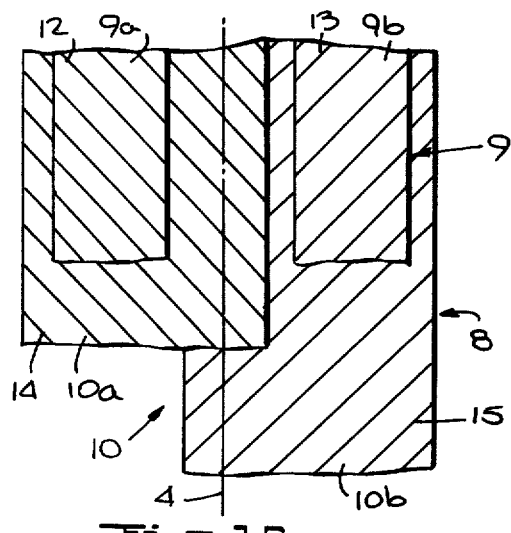

Referring now to the drawings, and more particularly to FIG. 1, the present invention relates to an improvement in a pneumatic tire 1, the tire having a carcass 2, preferably of the radial ply type, in which are encapsulated a plurality of radially oriented cords 3 which are substantially symmetrically disposed at 90° relative to a median equatorial plane 4 of the tire 1. The opposite free ends of the cords 3 are turned over or folded back around a pair of carcass-reinforcing beads 5. The circumfererential crown region of the carcass 2 is provided with a tread 6 having opposite shoulders 7 which merge with the carcass sidewalls. Between the tread 6 and the crown region of the carcass 2, there is interpositioned a reinforcing breaker assembly denoted generally by the reference character 8. The width, or axial extent, of the breaker 8, between its shoulders 7, corresponds to that of the tread 6, although it is not necessarily identical therewith.

Referring now to FIG. 2, the reinforcing breaker assembly 8 is comprised of a pair of plies 9a and 9b which overlie, and surround, another pair of plies 10a and 10b. For reference purposes, the plies 9a and 9b may be considered an outer, axially discontinuous, web 9, whereas the plies 10a and 10b may be considered an inner web 10 for supporting the web 9. The plies 10a and 10b have respective overlapping marginal edges in the region denoted generally by the reference character 11. The axial extent of the overlapping ply region 11 is denoted by the reference character R, whereas the axial spacing between the plies 9a and 9b (the discontinuity in the web 9) is denoted by the reference character e. The axial extent of the region e is equal to or greater than the axial extent of the region R.

As illustrated in FIG. 2, the plies 10a and 10b lie in a common circumferential plane, whereas the plies 9a and 9b lie in a second common circumferential plane surrounding the first said circumferential plane. Moreover, the right end of the ply 10a which overlaps the left end of the ply 10b lies in the very same circumferential plane defined by the plies 9a and 9b. The effective axial extent of the web 9 is defined by the reference character 1, the ply 9a having an axial extent la and the ply 9b having an axial extent lb. Similarly, the web 10 has an effective axial extent denoted by the reference character L, the ply 10a having an extent La and the ply 10b having an extent Lb.

The construction of the breaker 8 is such that it can effectively be slightly asymmetrically varied or altered during fabrication (based upon predetermined optimum design criteria for accommodating various road conditions) without the necessity for disturbing the basic superposed and overlapping relationship of the various plies with one another. The principal undisturbed relationship to be maintained by the plies with one another is that the radially inner plies 10a and 10b remain in overlapping relation with one another at the region 11, and the plies 9a and 9b remain axially separated from one another by at least the axial extent of the overlapping region 11 of the plies 10a and 10b. However, the axial extent of the plies 9a, 9b, 10a and 10b can be varied relative to one another, the axial extent of the overlapping region 11 can be altered, the precise location of the overlapping region 11 can be varied relative to the median equatorial plane 4, and the spacing between the plies 9a and 9b (the discontinuity in the web 9) can be varied, which variations even if slight have an effect on the breaker's capacity to accommodate various road conditions.

In this respect, the effective length $l$ of the web 9 can be greater than, equal to or less than the effective length L of the web 10. The axial extent la of the ply 9a can be greater than, equal to or less than the axial extent lb of the ply 9b. The axial extent La of the ply 10a can be greater than, equal to or less than the axial extent Lb of the ply 10b. The axial extent R of the overlapping region 11 can be greater than, equal to or less than the axial extent of one or both of the plies 9a and 9b.

Moreover, the precise location at which the overlapping region 11 of the plies 10 is to be located relative to the median equatorial plane 4 of the tire 1 can be bisected as illustrated in FIG. 2 or, alternatively, it can be either to the left or to the right of the plane 4. The spacing $d$ between the right edge of the ply 9a and the left side of the overlapping region 11 can be greater than, equal to or less than a similar spacing between the left edge of the ply 9b and the right side of the overlapping region 11. Thus, the construction of a pair of overlapping plies 10a, 10b surrounded by a pair of axially spaced plies 9a and 9b, provides for a substantially uniformly thick breaker assembly whose asymmetrical character can be effectually varied in numerous, although slight, ways to govern tire behavior, control and stability, as well as riding comfort.

Figure 14:
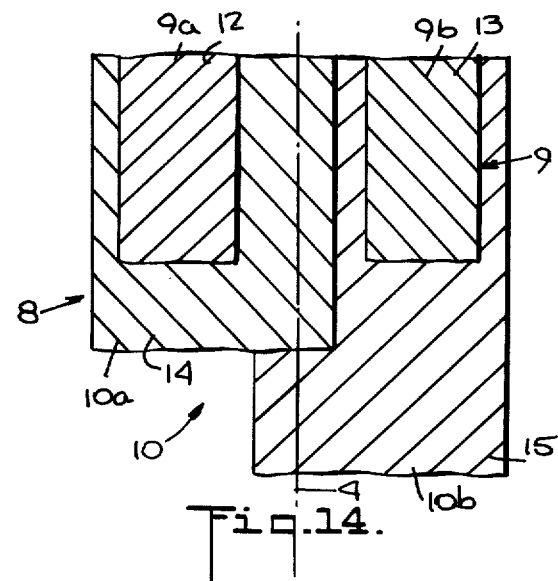
Figure 15:
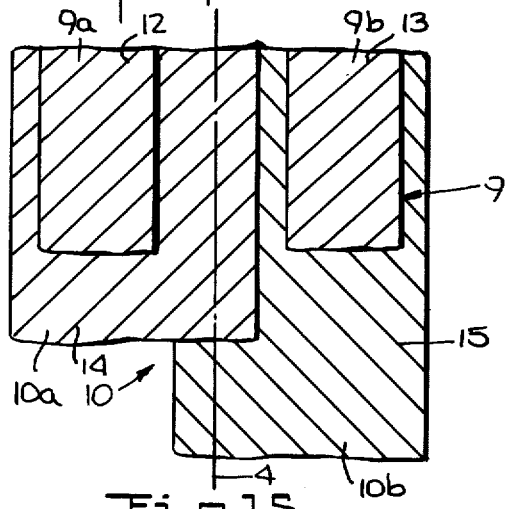
Figure 16:
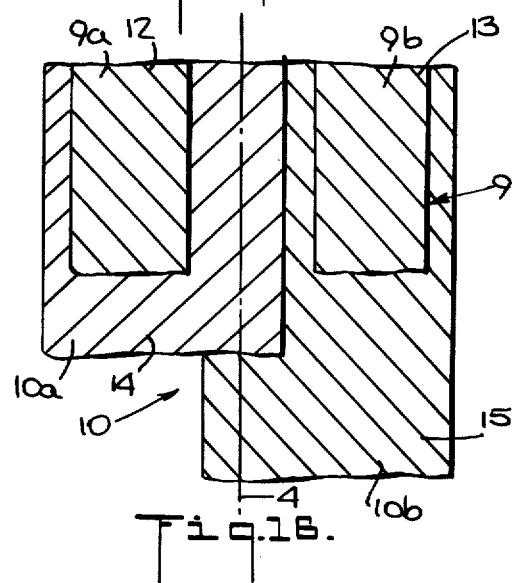
Figure 17:
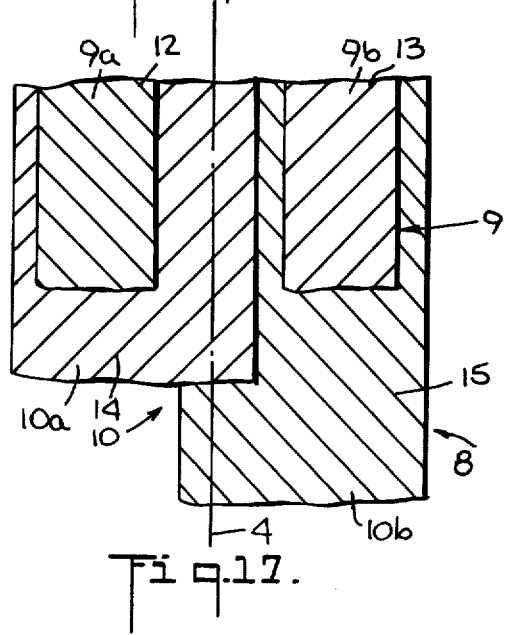
Figure 18:
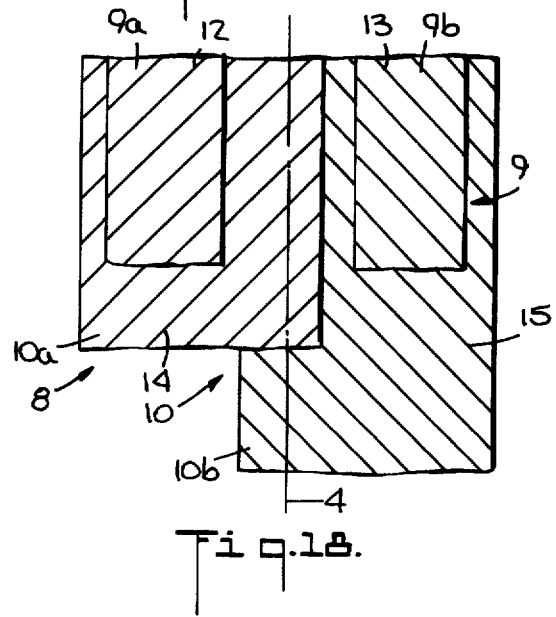

Referring now to FIGS. 3 through 18, there are illustrated sixteen different ways by which the plies 9a and 9b of the web 9 and the plies 10a and 10b of the web 10 may be varied relative to one another with regard to their reinforcing cords. For reference purposes, the reinforcing cords in the ply 9a are denoted by the reference character 12, the reinforcing cords in the ply 9b are denoted by the reference character 13, the reinforcing cords in the ply 10a are denoted by the reference character 14, and the reinforcing cords in the ply 10b are denoted by the reference character 15.

The reinforcing cords in each and every one of the plies defines an angle in the range of between 14° and 45° relative to the median equatorial plane 4. The sixteen embodiments of the FIGS. 3 through 18, respectively, mostly differ from one another with regard to the slope sign of the cords in one ply relative to the slope sign of the cords in at least one of the other plies. For reference purposes herein, the sign of the slope of the cords in the plies is as defined conventionally; namely, a slope of positive sign extends upwardly from left to right, whereas a slope of negative sign extends downwardly from left to right.

A comparison of the different embodiments with regard to their distinctive cord slope-characteristics is defined in Appendix-Table A, appended hereto. The different embodiments are arranged in columns and denoted by their corresponding figure numbers, whereas the plies are arranged in rows and denoted by their respective reference characters. A + sign denotes a positive cord slope of a particular ply, whereas a − sign denotes a negative cord slope of a particular ply.

Accordingly, with reference to Table A, for purposes of illustration, the embodiment of FIG. 8 is such that the slope signs of the cords 12, 13, 14 and 15 of the plies 9a, 9b, 10a and 10b, respectively, are all negative. On the other hand, for example, in the embodiment of FIG. 7, the cords 12 and 13 of the plies 9a and 9b, respectively, have positive slopes, whereas the cords 14 and 15 of the plies 10a and 10b, respectively, have negative slopes. Thus, without detailing herein each and every one of the slope characteristics of the different embodiments of FIGS. 3 through 18, it can be well appreciated that because of the provision of the two pairs of plies 9a, 9b and 10a, 10b, there results sixteen different additional ways of varying the asymmetry of the breaker 8.

It will be understood that not only can the aforementioned variations be effected to alter the asymmetry of the breaker 8, but there are still other variations which may be effected such as, for example, altering the thickness and/or material of the plies relative to one another, and altering the thickness and/or material of the cords relative to one another, etc. All such variations alone and in cooperation with one another facilitate the design of a pneumatic tire which can effectively accommodate various road conditions with optimum control, stability and riding comfort.

The foregoing description of preferred embodiments of the present invention is for purposes of illustration only, and it will be understood that the various structural and operational features and relationships herein disclosed are susceptible to a number of modifications and changes none of which entails any departure from the spirit and scope of the present invention as defined in the hereto appended claims.

TABLE A

| PLY | APPENDIX FIGURE | | | | | | | | | | | | | | | |
|---|---|---|---|---|---|---|---|---|---|---|---|---|---|---|---|---|
| | 8 | 10 | 9 | 16 | 12 | 7 | 18 | 14 | 13 | 4 | 17 | 15 | 11 | 6 | 5 | 3 |
| 9a | − | + | − | − | − | + | + | + | − | − | − | + | + | + | − | + |
| 9b | − | − | + | − | − | + | − | − | + | − | + | + | + | − | + | + |
| 10a | − | − | − | + | − | − | + | − | − | + | + | + | − | + | + | + |
| 10b | − | − | − | − | + | − | − | + | + | + | − | − | + | + | + | + |

What is claimed is:

1. A pneumatic tire comprising a carcass having a crown region, a tread overlying said crown region, and a reinforcing breaker interposed between said tread and carcass, said breaker comprising a first pair of plies lying substantially in a common circumferential plane, said plies having respective marginal edge portions one of which overlaps the other and defines a second circumferential plane surrounding the first said circumferential plane, and a second pair of plies overlying said first pair of plies, extending in said second circumferential plane and axially spaced from one another by said overlapping marginal edge portions of said first pair of plies.

2. A pneumatic tire as claimed in claim 1, wherein said overlapping marginal edge portions extend proximate to a median equatorial plane of said tire.

3. A pneumatic tire as claimed in claim 2, wherein said overlapping marginal edge portions extend across and are bisected by said median equatorial plane.

4. A pneumatic tire as claimed in claim 1, wherein said first pair of plies have the same axial extent relative to one another, and said second pair of plies have the same axial extent relative to one another.

5. A pneumatic tire as claimed in claim 1, wherein said first pair of plies have different axial extents relative to one another, and said second pair of plies have different axial extents relative to one another.

6. A pneumatic tire as claimed in claim 1, wherein said first pair of plies have respective axially outer edges which extend axially beyond respective axially outer edges of said second pair of plies.

7. A pneumatic tire as claimed in claim 1, wherein said second pair of plies have respective axially outer edges which extend axially beyond respective axially outer edges of said first pair of plies.

8. A pneumatic tire as claimed in claim 1, wherein said breaker has an axial extent which is greater than said tread.

9. A pneumatic tire as claimed in claim 1, wherein said breaker has an axial extent which is less than said tread.

10. A pneumatic tire as claimed in claim 1, wherein said first and second pairs of plies each includes therein parallel spaced reinforcing cords.

11. A pneumatic tire as claimed in claim 10, wherein the reinforcing cords in each of said first pair of plies have slopes of the same sign.

12. A pneumatic tire as claimed in claim 10, wherein the reinforcing cords in one ply of said first pair of plies have a slope of opposite sign from the cords in the other ply of said first pair of plies.

13. A pneumatic tire as claimed in claim 10, wherein the reinforcing cords in each of said second pair of plies have slopes of the same sign.

14. A pneumatic tire as claimed in claim 10, wherein the reinforcing cords in one ply of said second pair of plies have a slope of opposite sign from the cords in the other ply of said second pair of plies.

15. A pneumatic tire as claimed in claim 10, wherein the reinforcing cords in said first and second pairs of plies have an angle relative to the median equatorial plane of the tire in a range of between 14° and 45°.

16. A pneumatic tire as claimed in claim 10, wherein the reinforcing cords of at least one ply in said first and second pairs of plies are of a different material from the cords of at least one other ply of said first and second pairs.

17. A pneumatic tire as claimed in claim 10, wherein the reinforcing cords of at least one ply in said first and second pairs of plies are of a different thickness from the cords of at least one other ply of said first and second pairs.

* * * * *